Patented Apr. 17, 1951

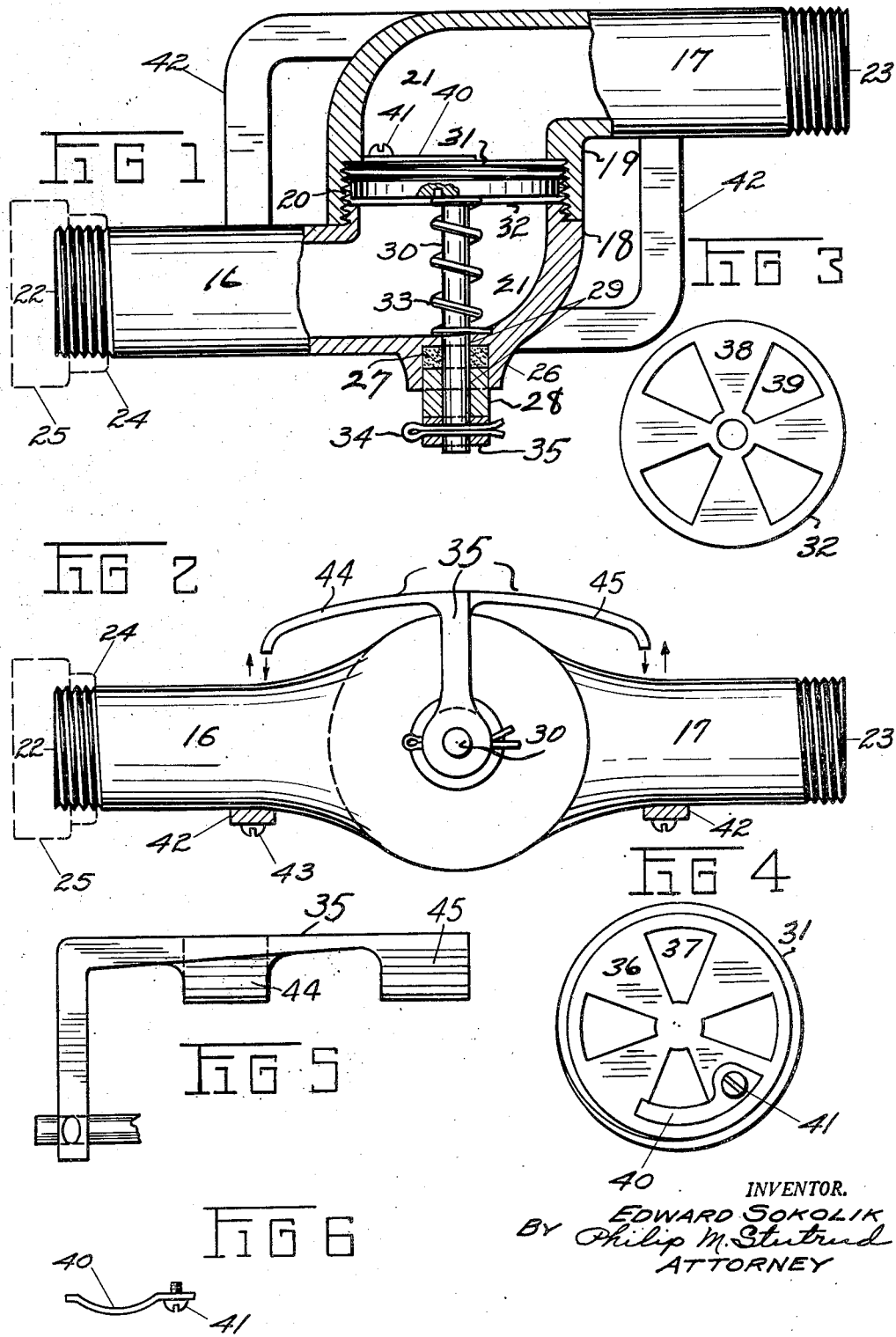

2,549,537

UNITED STATES PATENT OFFICE 2,549,537

AUXILIARY VALVE FOR SPRINKLING

Edward Sokolik, New Brighton, Minn.

Application October 17, 1949, Serial No. 121,663

4 Claims. (Cl. 251—90)

This invention relates to auxiliary valves for sprinkling, which may be interposed in a hose line between water plug and sprinkler, to obviate going to the water plug to move the sprinkler, and which valve is subject to either hand or foot operation.

There is lacking, a device in this field, to meet the needs. In sprinkling a lawn, flower bed or garden, it is necessary to move the sprinkler many times, to cover the area. Each time that the sprinkler is moved, it is necessary to shut off the water, move the sprinkler and then turn on the water again. With a long hose line, this requires considerable time and much walking. If the hose line were provided with a valve, just outside the sprinkling range of the sprinkler, much time would be saved and convenience increased. Such a valve should be convenient to operate, so that the sprinkler may be quickly moved and put into operation again.

An important object of my invention is to provide an auxiliary valve, which may be readily inserted in a hose line just outside the sprinkling range of a sprinkler, to shut off the water without going to the water plug each time the sprinkler must be moved.

Another important object is to provide such an auxiliary valve with an actuating lever, that may be operated by the foot, without stooping, as well as by hand.

Another object is to provide such an auxiliary valve by a construction, that can be cheaply manufactured and still sufficiently serve the purpose.

Other objects will be apparent from the description and appended claims.

For a full disclosure of my invention, reference is made to the description following and to the drawings, in which—

Fig. 1 is a top view of my auxiliary valve for sprinkling, as it would appear in operative position, but having a portion broken away to show a sectional view of the working parts.

Fig. 2 is a side elevation view, as viewed from the side on which the actuating lever is secured to the shaft.

Figs. 3 and 4 are views of the rotative and fixed discs respectively.

Fig. 5 is a view of the actuating lever only.

Fig. 6 is another view of the spring detent, employed with the discs, as shown also in Fig. 4.

In my auxiliary valve for sprinkling, which is hereby disclosed, I provide a valve casing consisting of two parts 16 and 17, the interior contours of which are in general the same. These parts have enlarged portions 18 and 19 respectively, which are screw-threadedly joined at 20, forming a common chamber 21. Although the valve would function in either position, it is preferable, that the water enter through the part 16 and be discharged through the part 17. To fit into conventional hose lines, female and male screw threaded connections should therefore be provided at ends 22 and 23 respectively. For this purpose, a conventional adaptor 24, as indicated in dotted outline, is applied to the end 22. This adaptor has a rotatable collar 25, for engaging a male screw threaded connection of a hose. To fit in special cases of hose or pipe lines, this adaptor may be applied to the end 23. The ends 22 and 23 may also consist of plain shanks, upon which the ends of hoses may be slipped and secured with clamps. In the member 16, I provide a boss 26, with an enlarged bore part way through same, to accommodate packing 27 and a gland 28. Through the gland and packing and through the inner wall of the member 16, a bore 29 accommodates a stem or shaft 30. As will be subsequently explained, this shaft operates a disc valve. This disc valve consists, in the main, of a fixed disc 31 and a movable disc 32. It will be noted, that the screw threaded joining at 20 of the two parts of the casing, also provides for screw-threadedly seating the disc 31 and for a space for the movable disc 32. The disc 32 is of a reduced diameter, to provide clearance for turning in the space provided. The shaft 30 has one end screw-threadedly connected or welded to the disc 32. A coil spring 33 encircles the shaft 30, and is compressed between the valve casing and the disc 32, forcing the latter tightly against the disc 31. It will be observed, that the ends of the coil spring 33 engage notches in the casing and in the disc 32 respectively. As will be subsequently explained, this serves to positively keep the valve fully open, when so intended. A conventional cotter key 34 or a pin secures an actuating lever 35 to the shaft 30. This lever-pedal is bent to one side over the valve body to bridge the casing parts 16 and 17. The portion of the pedal 35 that superposes the valve body, has pedal-arms 44 and 45 oppositely extended over the parts 16 and 17. These pedal arms also afford stops to alternately engage the parts 16 and 17 to limit the movement of the valve disc 32 to a closed or open position by movement of the lever-pedal 35. The opening and closing of the valve is accomplished, by alternate closures and ports 36 and 37 respectively of the fixed disc, being rotatively engaged by alternate closures and ports 38 and 39 respectively of the movable disc. As previously referred to, the movable disc 32 is rotatively operated by the shaft 30, and the coil spring 33 encircling the shaft, keeps the valve fully open, when so intended. So that the valve will likewise be retentively positioned when open, I provide a spring tension member 40, secured to the fixed disc 31 with a machine screw 41. This member is of arcuate shape and also has an arcuate bend, with respect to its plane. This bend extends into the opening of a port 37, sufficiently to form frictional engagement with a closure 38, of the movable disc. This, therefore, keeps the valve fully closed, when so intended. To maintain a stable position of the valve, with the actuating lever pedal upward and easily accessible, I provide a member 42. This may be welded to the valve, but is preferably secured with machine screws 43, to not interfere with the taking apart of the valve for cleaning, renewing packing and repairs. For clarity, this member is shown in section in Fig. 2. It may be of greater length, than shown in Fig. 1, and may also extend in the opposite direction. Its outline may be of different shapes, but preferably would be oval or circular, so that it is not obstructive.

From the foregoing, it is apparent how my auxiliary valve for sprinkling is constructed, and that it must have many desirable features. Inserted with a shorter length of hose, adjacent to the sprinkler, of sufficient length to keep the operator of the valve out of the range of the sprinkler, it saves much time and reduces the inconvenience of sprinkling. This is particularly vital with long hose lines. To cover a substantial area, the sprinkler must be moved many times. Unless equipped with such a valve as this, there is much walking and much time consumed, in turning the water off and on. Also, my valve is opened or closed instantly, in contrast to the tedious turning off and on of a water plug or sill cock. It can also be operated by the foot, as well as the hand, so there is no need to stoop. It can, in fact, be operated, by moving the lever-pedal 35 by a stride of the foot in the ordinary process of walking, without interruption. The valve can be cheaply manufactured, as there is no need of refinement in the finish of the discs, which may be produced by stamping, to produce only a reasonably fluid tight joint. The valve is intermittently closed for short periods of time, and leaks are immaterial, as long as same are not sufficient to operate the sprinkler. When the sprinkling is completed, the primary valve is closed.

While I have shown and described a preferred form of my invention, it is obvious that many changes, which are within the scope of my invention, will be apparent to those skilled in the art. I therefore desire to be limited by the scope of the appended claims.

What I claim is:

1. A valve device for controlling a water sprinkler comprising a valve casing, a pair of concentric contacting discs with corresponding registering ports, a shaft secured to one of said discs and a lever for turning said shaft, said casing consisting of two parts having the same general interior contour and screw threadedly joined, said parts having enlarged portions in the region of said joining forming a common chamber and the outer extremities of said parts having means for interposing same in a hose line, one of said discs being screw threadedly seated in common with the screw threaded joining of said parts, the other disc being movable and having a reduced diameter for turning clearance of said screw threads, said shaft extending through one of the parts of said casing and provided with a packing gland and a coil spring, said coil spring encircling said shaft and spring loading said movable disc, the ends of said spring engaging notches respectively in said casing and said disc to normally maintain said ports in open position, said fixed disc having a spring member with an arcuate bend thrusting through a port making frictional engagement with said movable disc to overcome torque of said coil spring and maintain said ports in closed position, said lever being secured to the outer extremity of said shaft and having substantially a right angle bend with a two way extending portion beyond said bend conforming closely to the contour of the parts of said casing, the extremities of said portion being positioned with respect to the parts of said casing to provide stop limits for opening and closing of said ports by determined amount of rotary movement of said lever, whereby the valve may be operated by the foot as well as by hand and eliminating any stooping.

2. A valve device as claimed in claim 1, characterized by the addition of a position stabilizing member, comprising an element of curved outline lying flat and secured to the two parts of the casing on the side opposite the outward extremity of the handle.

3. An auxiliary valve interposed in a water line for controlling a sprinkler, comprising a valve casing consisting of two parts of angular shape and generally similar interior contour, said parts being screw threadedly joined and having enlarged portions forming a chamber by said joining, said parts having screw threaded connections at their outer extremities for male and female connections respectively of a water line, a rotatively movable valve disc with a plurality of ports, a valve seat with a plurality of corresponding ports secured in said chamber, the respective parts of each registering with each other in open positions, a shaft secured to said movable disc and extending outwardly through one of the parts of said casing, said shaft having a packing gland in said casing and a coil spring encircling said shaft, said coil spring interposed between said movable disc and said casing spring loading said movable disc and having means securing ends of said spring respectively to said disc and said casing to normally maintain ports of said movable disc in open position, said valve seat having a spring member with an arcuate bend thrusting through one of its ports making frictional engagement with said movable disc to overcome torque of said coil spring to maintain said ports in closed position, a lever secured to the outer end of said shaft, said lever having a bend conforming closely to the contour of said casing and beyond said bend having right angle projections on opposite sides bent inwardly toward the parts of said casing sufficiently to provide stop limits for opening and closing of said ports by determined amount of rotary movement of said lever, whereby said auxiliary valve inserted in a hose line just outside the sprinkling range of a sprinkler provides for shutting off the water without going to the primary valve each time the sprinkler must be moved.

4. An auxiliary valve, as claimed in claim 3, characterized by the addition of a member to stabilize the position thereof and maintain the lever in accessible position, said member comprising a bar bent into a continuous element of substantially curved shape with fastenings to the two parts of the casing and lying in a plane parallel to the shaft.

EDWARD SOKOLIK.

REFERENCES CITED

The following references are of record in the file of this patent:

UNITED STATES PATENTS

| Number | Name | Date |
|---|---|---|
| Re. 5,790 | Stevens | Mar. 10, 1874 |
| 86,268 | Baker | Jan. 26, 1869 |
| 464,620 | Decarie et al. | Dec. 8, 1891 |
| 708,785 | Staaf | Sept. 9, 1902 |

FOREIGN PATENTS

| Number | Country | Date |
|---|---|---|
| 46,723 | Denmark | Jan. 2, 1933 |
| 489,216 | France | Sept. 6, 1919 |